Dec. 25, 1951     E. M. CHURCHFIELD ET AL     2,579,797
ANIMAL SEAT AND EXERCISING DEVICE
Filed June 16, 1949     2 SHEETS—SHEET 1
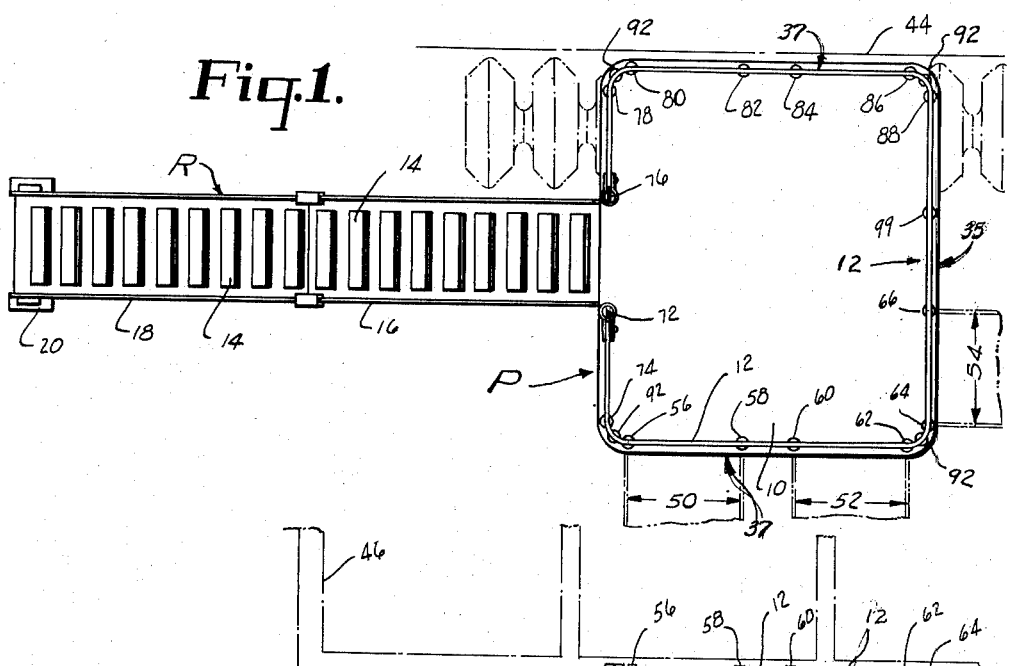
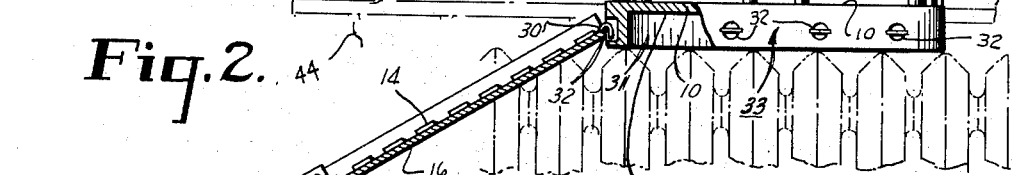
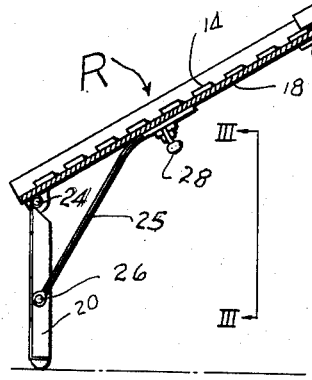
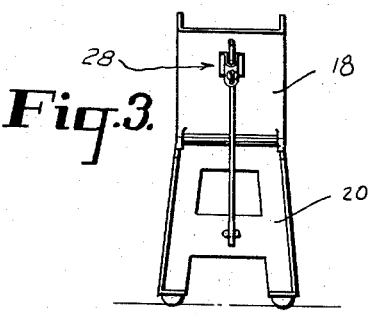
INVENTOR.
ELIZABETH M. CHURCHFIELD
BY & WILFRED BARNES, JR.
Louis Nucho
ATTORNEY Dec. 25, 1951    E. M. CHURCHFIELD ET AL    2,579,797
ANIMAL SEAT AND EXERCISING DEVICE
Filed June 16, 1949                                    2 SHEETS—SHEET 2
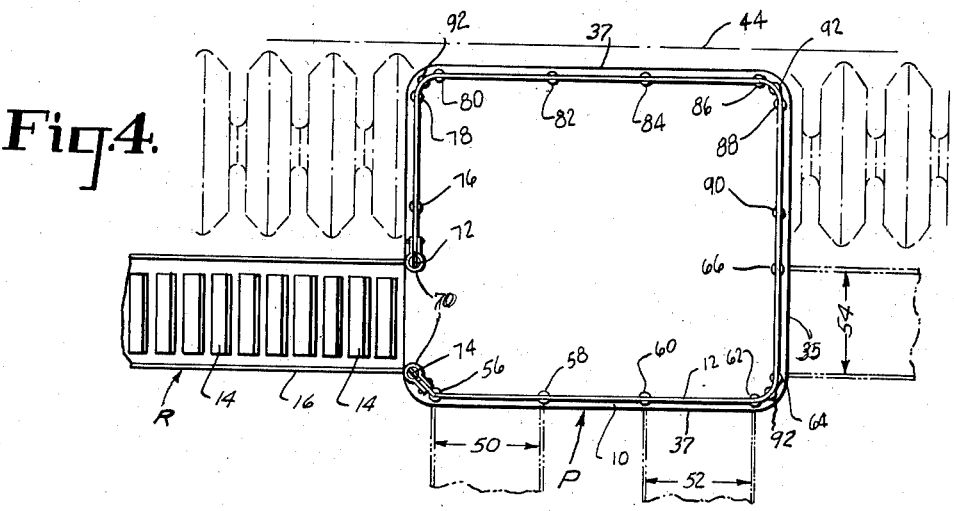
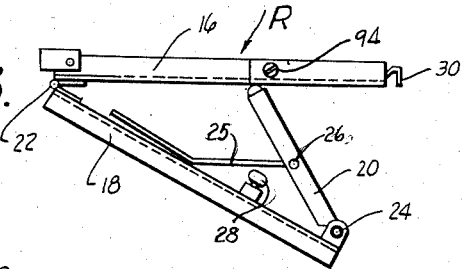
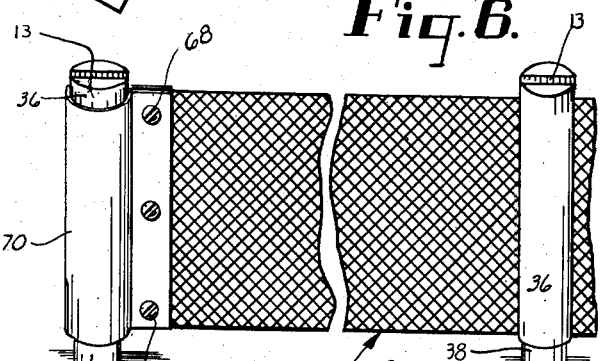
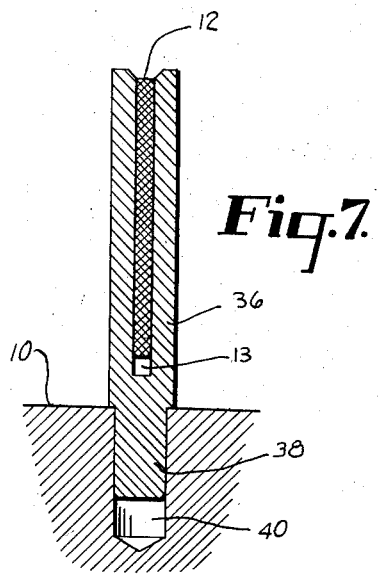
INVENTOR.
ELIZABETH M. CHURCHFIELD
& WILFRED BARNES, JR.
BY
Louis Necho
ATTORNEY Patented Dec. 25, 1951

2,579,797

UNITED STATES PATENT OFFICE 2,579,797

ANIMAL SEAT AND EXERCISING DEVICE

Elizabeth M. Churchfield and Wilfred Barnes, Jr., Upper Darby, Pa.

Application June 16, 1949, Serial No. 99,376

1 Claim. (Cl. 119—1)

As is known to those who have, or have had indoor pet dogs, it is necessary to provide some form of exercise. Also, it is common knowledge that when dogs hear a noise outside, they want to know what is going on. The larger breeds jump up on window sills or on available furniture, thus causing damage. The smaller breeds put their front paws against the door, thus scratching the door, and, because they can not see what is taking place, they suffer a certain amount of frustration.

It is therefore the object of the invention to produce an elevated seat or platform from which a dog can look out through a window and to reach which the dog has to climb up a ramp, thus giving the dog a certain amount of exercise.

A further object is to produce an apparatus for the purpose set forth which will be of a "flexible" structure in that it can be adapted to fit the requirements of different rooms, or different types, or different arrangements, of furniture.

A still further object is to produce apparatus for the purpose set forth which will be light and easy to set up and take down.

A still further object is to produce apparatus for the purpose set forth some parts of which will be collapsible and other parts of which will be easy to take apart or dismantle so as to be readily moved about or stored away.

A still further object is to produce apparatus for the purpose set forth which will be inexpensive to manufacture.

These and other objects are attained by our invention as set forth in the following specification and as illustrated in the accompanying drawings in which:

Fig. 1 is a top plan view of a combined elevated seat and exercising device embodying our invention.

Fig. 2 is a view, partly in vertical section and partly in side elevation of the apparatus shown in Fig. 1.

Fig. 3 is a view looking in the direction of line 3—3 on Fig. 2, showing details of construction.

Fig. 4 is a fragmentary top plan view showing the apparatus in a slightly different position.

Fig. 5 is a side elevational view showing the ramp collapsed.

Fig. 6 is an enlarged fragmentary perspective view showing the side wall forming part of apparatus, detached from the seat or platform.

Fig. 7 is a further enlarged fragmentary, vertical sectional view showing how the side wall of Fig. 6 is mounted in position.

The apparatus disclosed includes raised platform, or seat, P, and a ramp R affording access to said seat. The seat includes a flat body member 10 formed of any suitable, and, preferably, light and poor heat conducting material such as plywood. The seat further includes a side wall or guard rail 12, which is preferably formed of a yielding flexible material, such as heavy canvas or the like, and means for detachably securing the guard rail 12 to the upper side of the seat 10.

The ramp R is preferably formed of a light rigid material such as sheet metal, plywood, or the like, and is provided with suitable non slip treads 14. The ramp R is also preferably made in a plurality of sections 16 and 18 and is provided with a step or riser 20 for elevating the lower end of the ramp from the floor as best shown in Fig. 2. The two, or more, sections 16 and 18 are hinged together as at 22 so that when the ramp is in use, the adjacent ends of the sections will be supported by the hinge 22 and will provide a continuous surface. The riser 20 is also hinged at 24 and is retained in the position of Fig. 2 by means of a rod 25, hinged at 26 to the riser and having its other end detachably engageable with the underside of the ramp by any suitable means such as thumbscrew 28 or the like.

The upper end of the ramp is provided with hooks 30 which are adapted to engage eye bolts or the like 32 whereby the ramp may be detachably secured to the vertical sides 31 of an apron 33 of the seat 10 as best shown in Fig. 2. The eye bolts are preferably positioned in recesses 34, to the end that they do not project beyond the vertical edge of the seat as best shown in Figs. 1 and 2.

The guard rail 12 may be suitably secured to the upper side of the seat 10 in any convenient manner. However, in the embodiment illustrated, the guard rail 12 is placed in slots 13 formed in pins 36 which are provided with reduced lower portions 38 adapted to be inserted in recesses 40 formed in the upper surface of the seat 10, as shown in Fig. 7.

As will be seen from Figs. 1 and 4, the seat is preferably made oblong, or longer in one direction than the other so that it may be placed with its longer side 35 paralleling the wall 44 of the room, as in Fig. 4, or with its shorter side 37 paralleling the wall of the room as in Fig. 1, according to the available space or other requirements. For example, if the seat 10 is placed on top of a radiator located adjacent a window 46 so as to enable a dog or cat to look out the window, and if there are no lateral obstructions, the seat can be placed as shown in Fig. 4. If however, the space in that direction is limited, the seat can be turned around to the position of Fig. 1. Likewise, the ramp may be placed in the position shown in solid lines in Figs. 1, 2 and 4, or it may be placed in any of the broken line positions 50, 52 or 54.

In order to make it possible to change the position of the seat or of the ramp according to space limitations, the recesses 46 are so spaced that when pins 36 are inserted in selected pairs of these recesses, they will form gates or entrances corresponding to the positions 50, 52 and 54 of the ramp. As shown in Fig. 4, for example, by engaging the ends of the guard 12 to pins 56 and 58 a gate or entrance opening leading to the seat 10 will be formed which will correspond to ramp position 50 and by connecting the ends of the guard 12 to pins 60 and 62 or 64 and 66 in the same figure, entrance openings will be formed to correspond to ramp position 52 or ramp position 54 as the case may be.

The ends of the guard 12 are preferably detachably secured as by bolts and nuts or the like, between two flanges 68 of a tubular member 70, as best shown in Fig. 6. Therefore, to position, or to change the position of the guard 12 relative to the seat 10, the guard is lifted upwardly until the tubular members 70 are above the pins and the guard is then lowered to bring the tubular members into engagement with selected gate-forming pins, with the tubular members 70 encircling the selected gate-forming pins. As shown in Fig. 4, the tubular members 70 engage pins 72 and 74 so as to form an entrance way corresponding to the solid line position of the ramp as shown in Fig. 4.

When the seat is turned around to the position of Fig. 1, or to some other position, the remaining pins 76 and 78; 80 and 82; 84 and 86; and 88 and 90 will be selectively engaged by the tubular members 70 to produce respective, corresponding entrance ways for corresponding ramp positions. In other words, many differently located entrances can be produced by merely changing the position of the guard 12 relative to the seat 10.

In addition to the gate-forming pins above referred to, auxiliary pins 92 may be used. These pins are identical with the pins already described except that they are not spaced relative to each other, or relative to the pins which are to be engaged by the tubular members 70 and hence they do not coact to produce entrance ways. The pins 92 serve to provide abutments as points of support for the guard 12.

To set up the apparatus from a completely dismantled condition, the guard 12 is mounted on the seat 10 so as to produce an entrance way at the desired location and the seat 10 is placed on a radiator or other support. The ramp is then unfolded from the collapsed position of Fig. 5, the hooks 30 at the upper end of the ramp are engaged with the eye bolts which correspond to the selected gate-forming pins, and the riser 20 is erected into the position of Fig. 2.

When it is desired to pack the apparatus for removal or for storage, the ramp is detached, folded and placed on top of the seat 10 where it will be surrounded or enclosed by the guard 12 thus making an extremely compact and easily transported package.

While the guard 12 has been shown as being formed of fabric, it will be understood that it can be made of sheet metal or plywood or other light and sufficiently strong material and that, when the guard is made of such material, it can be made in one piece having an entrance opening, or it can be made of a number of sections detachably secured to each other.

When the guard 12 is made of fabric, it can be made to match the curtains on the window or the color scheme of the room.

What we claim is:

A combined elevated seat and exercising device, including a platform, an apron depending from the edges of said platform, pairs of uniformly spaced eye bolts carried by the sides of said apron, a ramp, a pair of hooks carried by one end of said ramp and spaced apart a distance equal to the distance between the eye bolts of each of said pairs of eye bolts, whereby said end of said ramp is detachably secured to more than one portion of each side of said apron, there being pairs of uniformly spaced recesses formed in the upper surface of said platform; a flexible guard rail, and a plurality of pins carried by said guard rail and engageable with said recesses, said recesses being spaced apart a distance equal to the width of said ramp, and the length of said guard rail being less than the length of the perimeter of the platform by a length equal to the spaces between the recesses of each of said pairs of recesses.

ELIZABETH M. CHURCHFIELD.
WILFRED BARNES, Jr.

REFERENCES CITED

The following references are of record in the file of this patent:

UNITED STATES PATENTS

| Number | Name | Date |
| --- | --- | --- |
| 1,133,489 | Manck | Mar. 30, 1915 |
| 1,232,437 | Simpson | July 3, 1917 |
| 1,239,848 | Townsend | Sept. 11, 1917 |
| 1,444,427 | Read | Feb. 6, 1923 |
| 1,701,670 | Feldman | Feb. 12, 1929 |

OTHER REFERENCES

Popular Mechanics, December 1943, page 113.
Science Illustrated, April 19, 1949, page 78.